(12) United States Patent
Bathory

(10) Patent No.: US 11,070,849 B2
(45) Date of Patent: Jul. 20, 2021

(54) EVENT PRODUCTION AND DISTRIBUTION NETWORKS, SYSTEMS, APPARATUSES, AND METHODS RELATED THERETO

(71) Applicant: Zoltan Bathory, Woodland Hills, CA (US)

(72) Inventor: Zoltan Bathory, Las Vegas, NV (US)

(*) Notice: Subject to any disclaimer, the term of this patent is extended or adjusted under 35 U.S.C. 154(b) by 0 days.

(21) Appl. No.: 16/995,489

(22) Filed: Aug. 17, 2020

(65) Prior Publication Data
US 2020/0404344 A1    Dec. 24, 2020

(51) Int. Cl.
| | |
|---|---|
| *H04N 21/2187* | (2011.01) |
| *H04N 21/431* | (2011.01) |
| *H04N 21/439* | (2011.01) |
| *H04N 21/44* | (2011.01) |
| *H04N 21/218* | (2011.01) |
| *H04N 21/478* | (2011.01) |
| *H04N 21/442* | (2011.01) |
| *G06F 3/16* | (2006.01) |
| *H04R 1/08* | (2006.01) |
| *H04R 1/02* | (2006.01) |
| *A63F 13/814* | (2014.01) |
| *G06T 13/40* | (2011.01) |
| *G06Q 30/06* | (2012.01) |

(52) U.S. Cl.
CPC ....... *H04N 21/2187* (2013.01); *A63F 13/814* (2014.09); *G06F 3/165* (2013.01); *G06T 13/40* (2013.01); *H04N 21/21805* (2013.01); *H04N 21/4312* (2013.01); *H04N 21/4398* (2013.01); *H04N 21/44* (2013.01); *H04N 21/44222* (2013.01); *H04N 21/47815* (2013.01); *H04R 1/02* (2013.01); *H04R 1/08* (2013.01); *G06Q 30/0633* (2013.01); *G06Q 30/0641* (2013.01)

(58) Field of Classification Search
None
See application file for complete search history.

(56) References Cited

U.S. PATENT DOCUMENTS

| | | | | |
|---|---|---|---|---|
| 2003/0233540 | A1* | 12/2003 | Banerjee | H04N 7/1675 713/153 |
| 2010/0150373 | A1* | 6/2010 | Sheth | H04R 5/04 381/82 |
| 2019/0104235 | A1* | 4/2019 | Sarkar | H04N 21/21805 |

* cited by examiner

*Primary Examiner* — Justin E Shepard
(74) *Attorney, Agent, or Firm* — Banner & Witcoff, Ltd.; Ross A. Dannenberg

(57) ABSTRACT

Live event production and distribution networks, systems, apparatuses and methods related thereto are described herein. The described innovations may be used not only to present live events to audiences, but to do so in a way that provides audience energy and feedback to the performer(s) (e.g., a band) in a manner akin to that which they receive during a traditional live performance, thereby energizing and motivating the performers to give the best live performance they can, even in the absence of a co-located live audience. Some or all of the audience members may be represented by a visual surrogate displayed on an audience feedback screen set up to be viewable by the performers. The screen may be sized to fill a curtain window of stage on which the performers are performing, and the performers may optionally interact with one or more people in the audience during the live performance.

24 Claims, 11 Drawing Sheets

EVENT PRODUCTION AND DISTRIBUTION NETWORKS, SYSTEMS, APPARATUSES, AND METHODS RELATED THERETO

FIELD

Aspects described herein generally relate to computer networks, and applications and services, provided thereon for production and distribution of live events. More specifically, one or more aspects provide event production and distribution networks, system, apparatuses, and methods through which live events (e.g., concerts, theater, public speakers, etc.) can be performed, produced, and provided to remotely located audiences of any size and geographic dispersity, in real time or reproduced later.

BACKGROUND 2020 is a year no one (few?) predicted. The global pandemic has changed our lives and the way we work, play, and socialize in innumerable ways. In addition, the pandemic has brought many lines of business to a near standstill, including the airline industry, brick and mortar retail stores, casinos, bars/restaurants, travel/tourism, and live entertainment (sports, music, theater, etc.), among others. Unless they pivot to new business models, many businesses will fail. While retail has pivoted to online shopping to survive, other industries remain dormant, compounded by difficulties in view of government regulation and limits placed on large gatherings of people in confined spaces. Live performance industries are particularly hard hit with this limitation, because performers (e.g., entertainers, musicians, public speakers, politicians, actors, singers, clergy, etc.) are unable to perform in front of audiences such as those larger than 50-250 people at a time. This is untenable to sustain ongoing businesses or organizations dependent on larger audiences for continued success.

Some entities have tried with limited success to sustain the live event industries by holding virtual concerts in already established online games. For example, Diplo and Travis Scott recently held "concerts" in the popular game FORTNITE. However, such events are novelties, and do not provide audience feedback and energy back to the performers. For audience members, these events are novelties that, once experienced, lose their luster and thus repeat attendance is limited. Virtual concerts and VR concerts do not provide a live concert experience, for either the performer or the audience, and thus the passion of a true live concert experience is lost for both.

BRIEF SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

To overcome limitations such as those described above, and to overcome other limitations that will be apparent upon reading and understanding the present specification, one or more aspects described herein provide a live event production and distribution network that not only presents a live event to an audience, but through which the performer receives audience feedback akin to, for example, that received during a live performance. This may energize and motivate the performer just as the performer would experience during a traditional live performance.

A production/performance system may be set up for a performer to give a live performance, which may be transmitted by audio and/or visual (e.g., audiovisual) means to a disparately and/or remotely located audience. The audience may be of any size, such as less than 1,000 people, more than 1,000 people, or in the range of 1 to 1 million (or more) people. Some or all of the audience members, in turn, may each be represented by a surrogate, which may be displayed back to the performer on an audience feedback display set up to be viewable by the performer (e.g., in front of or on the performer's stage). The performer may optionally interact with one or more of the audience members during the performance, such as in real time, as further described herein.

By using aspects described herein, not only may event attendees enjoy a live event from a remote location, but the event performer may be able to perform in the live event in a similar environment and may receive feedback, energy and inspiration from the audience as if the event were being performed as a traditional in-person live event with a live audience present in the same venue as the performer.

A first aspect described herein provides an event production system including an audience display screen made up of one or more video panels positioned and sized to form a viewable area substantially the size of a curtain window of a stage from which the audience display screen is visible, and positioned in relation to the stage to substantially fill the curtain window of the stage. The audience display screen may be connectable to a performance server to receive display information depicting a plurality of visual surrogates, each visual surrogate representative of a client device registered and logged in to a performance server to watch a live performance originating from the stage.

In some aspects, the event production system may further include a performance control device configured to present a user interface on a secondary display screen associated with the performance control device and through which the performance control device is configured to receive input selecting a surrogate displayed on the audience display screen. The performance control device may further send the user input to the performance server to trigger an enhanced interaction between a particular client device associated with the selected surrogate and a performer of the live event. In some embodiments the enhanced interaction may include activating a video feed originating from the particular client device for playback on the audience display screen. In some embodiments the event production system may further include one or more speakers in data communication with the performance server and positioned within earshot of the stage, and the enhanced interaction may include concurrently activating audio from a plurality of client devices and combining the audio for output by the one or more speakers.

According to a second aspect, a method of event production and distribution may include identifying, by a performance system, a plurality of client devices logged in to watch a live event, where each client device is associated with a benefit level selected from a plurality of benefits levels, where one benefit within each benefit level identifies an audiovisual benefit, and where each client device is associated with a visual surrogate. The method may further include receiving, by the performance system, a plurality of audiovisual streams of the live event; transmitting, from the performance system, to each of the plurality of client devices, one of the audiovisual streams of the live event selected based on the audiovisual benefit associated with each client device; generating a dynamic graphical depiction of an audience using the plurality of surrogates associated with the logged in client devices; and outputting in real time the dynamic graphical depiction of the audience for display on an audience display panel presented in front of one or more performers of the live event.

In some aspects of the method a first benefit level is associated with a first surrogate size, and a second benefit level is associated with a second surrogate size different from the first surrogate size, and the system may be configured to generate the dynamic graphical depiction of the audience on the audience display panel by depicting each surrogate at a size based on each client device's associated benefit level.

In some embodiments the method may further include generating a graphical user interface through which users can purchase one or more items of merchandise associated with the live event; unlocking, when a user purchases a first item, a first surrogate modification selectable by the purchasing user; and unlocking, when a user purchases a second item, a second surrogate modification selectable by the purchasing user, different from the first surrogate modification.

In some aspects the one or more surrogates may depict a video feed originating from the client device associated with that surrogate.

According to a third aspect, an event production system may include one or more video cameras configured to capture video of a performance on a stage; one or more microphones configured to capture audio of the performance on the stage; one or more speakers configured to provide audio to the stage; an audience display screen visible from the stage and sized to substantially fill a curtain size of the stage; and a performance server in data communication with the one or more video cameras, the one or more microphones, the one or more speakers, and the audience display screen. The performance server may include a processor and memory storing computer readable instructions that, when executed by the processor, configure the event production system to register a plurality of users for a first event; at an event start time, initiate an event audiovisual stream from the one or more video cameras and one or more microphones for playback to, for each registered user, a device associated with that user; display on the audience display screen a surrogate associated with each of the plurality of users during the event; and provide an interactive feature through which one or more registered users dynamically interact with a performer providing the performance during the event.

In some embodiments each registration may be associated with a benefit level selected from a plurality of benefit levels, and wherein each benefit level within the plurality of benefit levels is associated with a different set of benefits. According to an aspect, a first benefit level may be associated with a first audiovisual stream of the performance, and a second benefit level may be associated with a second audiovisual stream of the performance.

In some aspects, a first benefit level is associated with a first surrogate size for each user registered at the first benefit level, and a second benefit level is associated with a second surrogate size for each user registered at the second benefit level, and the system is configured to present each surrogate on the audience display screen at a size defined by each user's corresponding benefit level.

In some embodiments the event server may be further configured to present an online shop through which any registered user can purchase one or more items of merchandise associated with the event; when a user purchases a first item, unlock a first surrogate modification selectable by the purchasing user; and when a user purchases a second item, unlock a second surrogate modification selectable by the purchasing user, different from the first surrogate modification.

A fourth aspect may provide a live event production and distribution data processing system, comprising a processor and memory storing a live event database, a user database, and further storing computer readable instructions that, when executed by the processor, configure the performance server to receive input identifying a plurality of live events, each live event associated with a performer, a date/time, and a plurality of tickets, each ticket associated with one of a plurality of benefit levels, wherein at least two tickets are associated with different benefit levels, wherein each benefit level identifies an audiovisual level, and wherein each ticket has a corresponding price; and receive registration information input from a plurality of different users to watch one or more of the live events, wherein each registration comprises a purchase of a ticket based on the corresponding price. During each live event identified in the live event database, the live event production and distribution data processing device may receive a plurality of audiovisual data streams depicting the live event; selectively transmit one of the plurality of audiovisual streams to each client device associated with each user who purchased a ticket for that live event, wherein the selection of the particular audiovisual stream to transmit to each user is based on the audiovisual level identified by the benefit level associated with each user's ticket; generate a visual display depicting a plurality of surrogates, each representative of a different one of the registered users for the live event; and transmit the visual display to an audience feedback display panel visible by the performer of the live event.

In some embodiments the system may further include a merchandise database and may be further configured to perform receiving merchandize information representative of one or more items of merchandise, each associated with one or more live events, each associated with one or more benefits, and each associated with a price; presenting an ecommerce module through which users registered for a particular live event are able to purchase merchandise associated with that particular live event; and activating for a purchasing user, when the purchasing user purchases an item of merchandise, the one or more benefits associated with the item of merchandise. Optionally, a first item of merchandise may be an article of clothing, and a first benefit of the first item of merchandise is shipment of that article of clothing to the user, and a second benefit of the first item of merchandise is a virtual article of clothing usable to enhance an appearance of a surrogate associated with the user.

These and other aspects are described in more detail herein.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration various embodiments in which aspects described herein may be practiced. It is to be understood that other embodiments may be utilized, and structural and functional modifications may be made, without departing from the scope of the described aspects and embodiments. Aspects described herein are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of the terms "mounted," "connected," "interconnected," "coupled," "positioned," "engaged" and similar terms, is meant to include both direct and indirect mounting, connecting, coupling, positioning and engaging.

By way of introduction and in view of the additional details provided below, aspects described herein may provide, for example, a live event production and distribution network and viewing system and methods related thereto. By using aspects described herein, not only can event attendees enjoy a live event from a remote location, but the event performer can perform in a traditional manner while receiving feedback (and inspiration) from the audience, providing to the performer and/or the audience an experience similar to the live event being performed in a single location with a live audience present in the same venue as the performer.

Figure 1:
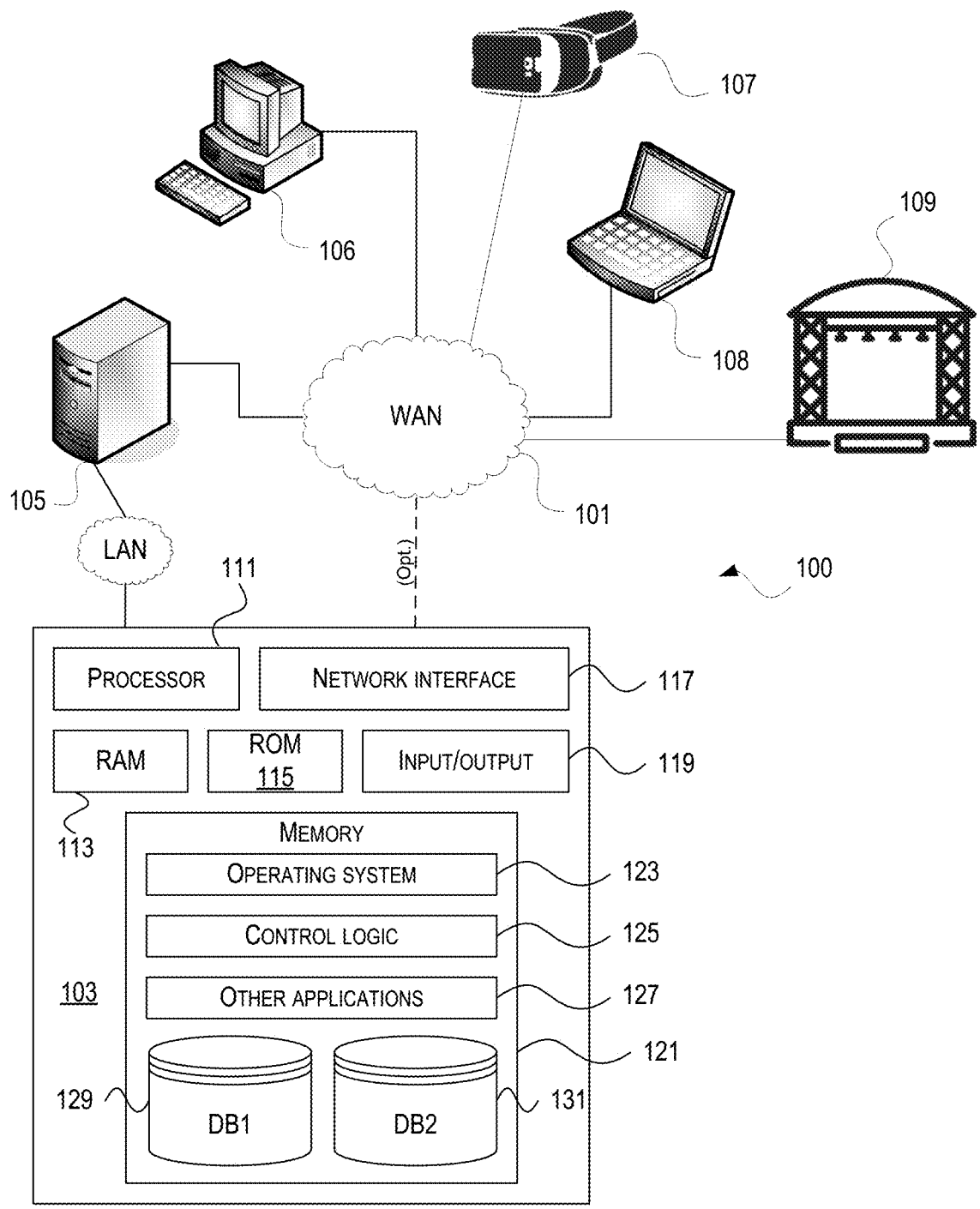
FIG. 1 illustrates an example of a computer network architecture and related components according to one or more illustrative aspects described herein.

FIG. 1 illustrates one example of a network architecture and data processing device that may be used to implement one or more illustrative aspects described herein. Various network nodes, such as elements 103 and/or 105-109, may be interconnected via a wide area network (WAN) 101, such as the Internet. Other networks may also or alternatively be used, including private intranets, corporate networks, LANs, wireless networks, personal networks (PAN), cellular phone/data networks, and the like. Network 101 is for illustration purposes, may represent a single network or multiple interconnected networks, and may be replaced with fewer or additional computer networks. A local area network (LAN), which may interconnect one or more of the elements of FIG. 1, such as elements 105 and 111 as shown, may have one or more of any known LAN topology and may use one or more of a variety of different protocols, such as Ethernet. Elements 103 and 105-109 and other devices or systems (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" can include not only a "physical network" but also a "content network," which is comprised of the data—attributable to a single entity—which resides across one or more physical networks.

The elements of the architecture shown in FIG. 1 may include performance server 103, web server 105, a plurality of audience clients such as elements 106, 107, and 108, and/or performance system 109. Performance server 103 may provide overall access, control and administration of databases and control software for performing one or more illustrative aspects described herein. Performance server 103 may be connected to web server 105 through which users interact with and obtain data as requested. Alternatively, performance server 103 may act as a web server itself and be directly connected to the Internet. Performance server 103 may be connected to web server 105 through the network 101 (e.g., the Internet), via direct or indirect connection, or via some other network. Users may interact with the performance server 103 using remote computers 106-109, e.g., using a web browser to connect to the performance server 103 via one or more externally exposed web sites hosted by web server 105. Client computers 106-109 may be used in concert with performance server 103 to access data stored therein, or may be used for other purposes. For example, from client device 107 a user may access web server 105 using an Internet browser, as is known in the art, or by executing a software application that communicates with web server 105 and/or performance server 103 over a computer network (such as the Internet).

Servers and software applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and performance server 103 may be combined on a single server.

Each component 103 and 105-109 may be any type of one or more known computers, (e.g., servers or other data processing devices), further customized to become a custom data processing device for use with a remote live event network in accordance with the teachings herein. Moreover, while elements described herein are referred to herein as a "server" by way of example, any of these elements may be implemented as one or more computing devices, such as one or more servers, desktop computers, laptop computers, tablet computers, smart phones, and/or any other types of computing devices, implementing one or more software applications, one or more sets of firmware, and/or one or more operating systems stored in one or more computer-readable media such as memory, flash drives, or disk drives.

Each or any element of FIG. 1, e.g., performance server 103, may include a processor 111 (or multiple processors) controlling overall operation of the device. Each device may further include computer-readable media (e.g., RAM 113, ROM 115, and/or other memory 121), at least one network interface 117, and/or at least one input/output (I/O) interface 119 (e.g., keyboard, mouse, display, and/or printer, video camera, microphone, etc.). I/O interface 119 may include one or more interface units and/or drivers for reading, writing, displaying, and/or printing files and/or other data. Memory 121 may further store operating system software 123 for controlling overall operation of the performance server 103, control logic 125 for instructing performance server 103 to perform aspects described herein, and other application software 127 providing secondary, support, and/or other functionality which may or may not be used in conjunction with other aspects described herein. Control logic 125 may also be referred to herein as data server software 125 when referring to the data server, or client software when referring to a client device such as any of elements 106-108. Functionality of the data server software 125 may include operations (e.g., decisions) made automatically based on rules coded into the control logic, made manually by a user providing input into the system, and/or a combination of automatic processing based on user input (e.g., queries, data updates, etc.).

Memory 121 may also store data used in performance of one or more aspects described herein, for example a first database (DB1) 129 and/or a second database (DB2) 131. One database may store event information, while the other may store user information. A third database (not shown) might include performer information. While first database 129 and second database 131 are shown as separate databases in FIG. 1, first database 129 may include second database 131 (e.g., as a separate table, report, etc.). That is, the information stored in databases 129 and 131 (and/or any other databases) can be stored in a single database, or separated into different logical, virtual, or physical databases, depending on system design. Elements 105-109 may have similar or different architectures as described with respect to performance server 103. Those of skill in the art will appreciate that the functionality of performance server 103 (or elements 105-109) as described herein may be spread across multiple data processing devices, for example, to distribute processing load across multiple computers, to segregate transactions based on geographic location, user access level, quality of service (QoS), etc.

One or more elements e.g., element 106, may include a virtual reality (VR), augmented reality (AR), or other extended reality (XR) device. As used herein, extended reality refers to virtual reality, augmented reality, or any combination of either AR and/or VR with each other or with other immersive technology in any capacity.

One or more aspects described herein may be embodied in computer-usable and/or readable data and/or computer-executable instructions, such as in one or more program modules, executed by one or more computers or other devices as described herein. Generally, program modules may include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on at least one computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects, and such data structures are contemplated within the scope of computer executable instructions and computer-usable data described herein.

Figure 2:
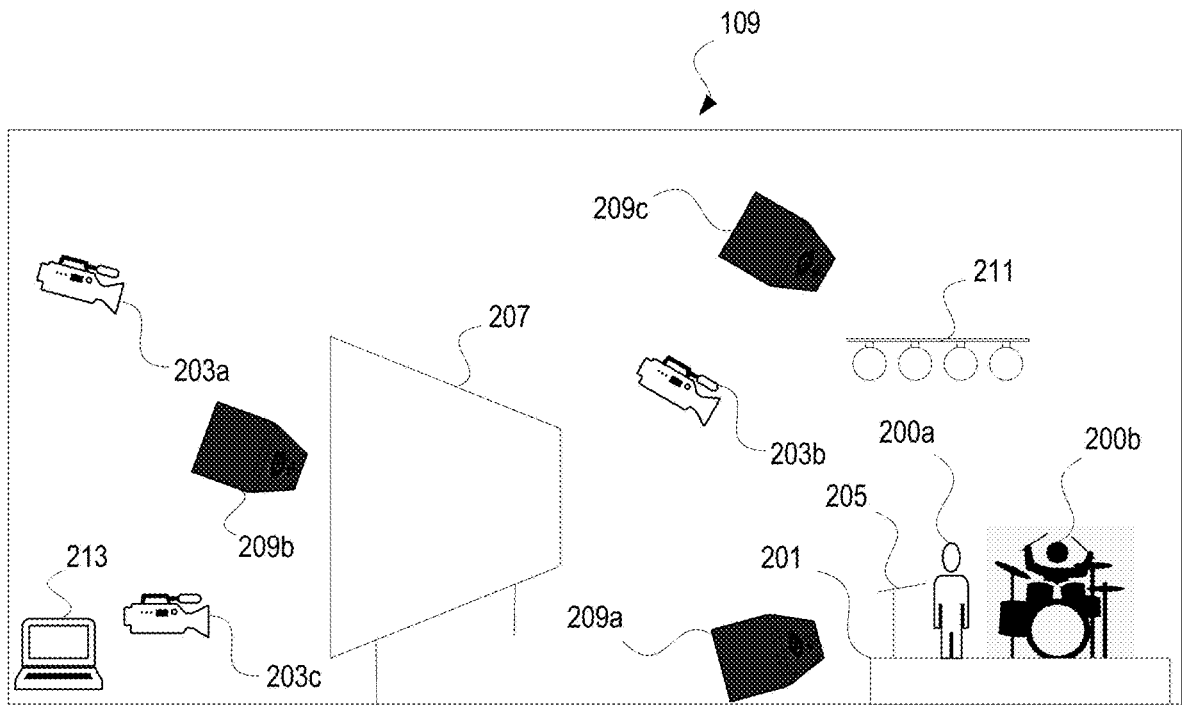
FIG. 2 illustrates an example of a performance system according to one or more illustrative aspects described herein.

Performance system 109 will now be described with further reference to FIG. 2. Performance system 109 may be a networked audiovisual presentation system through which one or more performers, such as performer 200A and/or performer 200B (e.g., speaker, clergy, politician, entertainer, performance artist, motivationalist, actor, singer, theater performer, comedian, acrobat, musician, band, or any other performer(s)), can perform, produce, and present an event to an audience of one or more people located remote from the performance venue. The audience may be sufficiently remote that they are not able to directly view the performance. The event may be provided to audience members' client devices in a number of ways, such as live in real time during the performance, live during the performance while being delayed for some amount of time, and/or recorded for playback to the audience at a later date and/or time after the performance has completed. The performance system 109 may be used with audiences large or small, e.g., from small and intimate performances for 1-100 people all the way up to mega audiences such as those that might fill stadiums of 30,000 or more people or even audiences much larger (e.g., millions of people spread geographically apart from one another). The audience size can be unlimited, as the current system may be scalable to accommodate any number of people in the audience at a given time.

Figure 11:
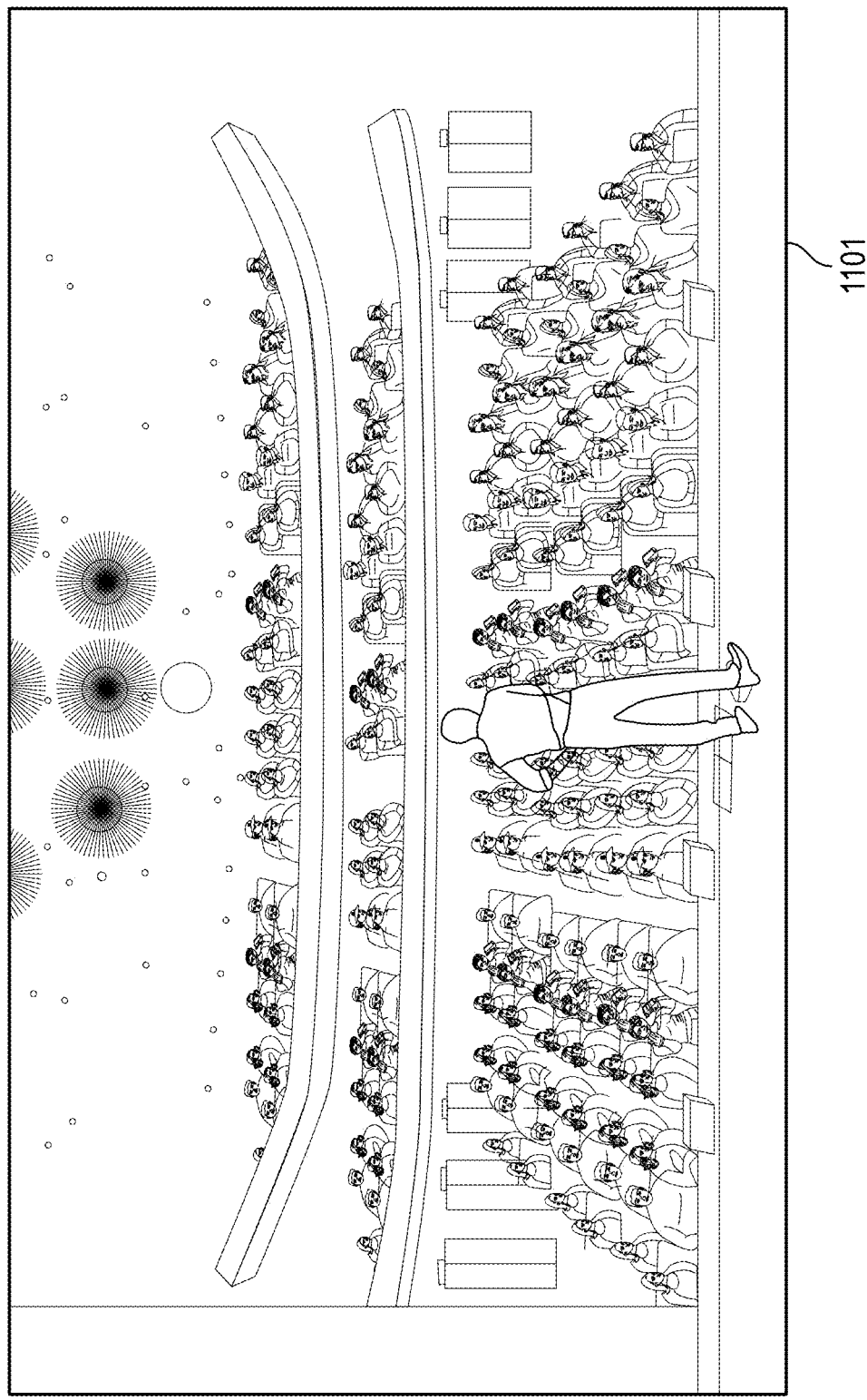
FIG. 11 illustrates a view of a performer giving a traditional live performance in front of an audience located within in the same venue.
Figure 12:
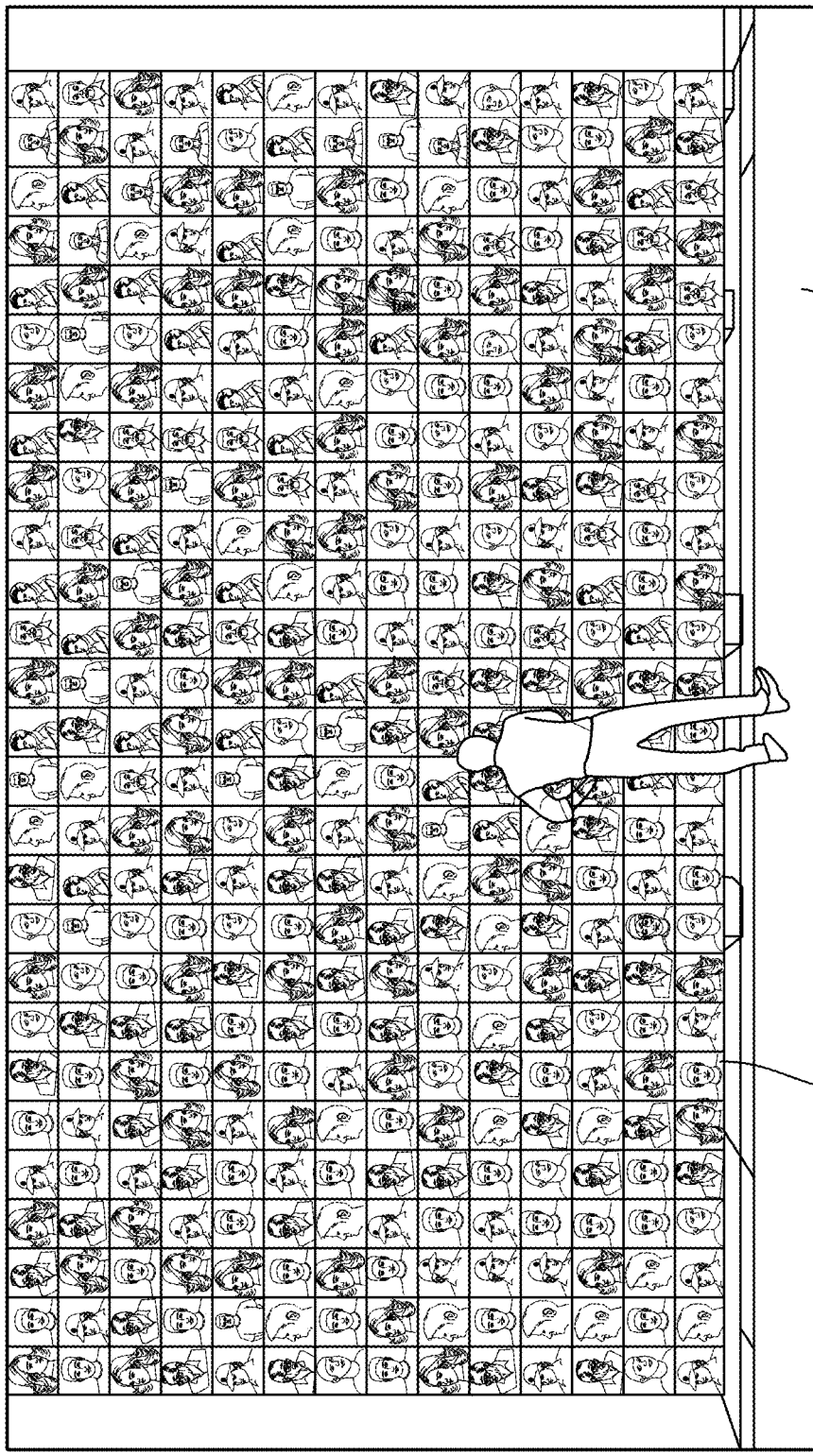
FIG. 12 illustrates a view of a performer giving a performance using an audience display screen according to one or more illustrative aspects described herein.

Performance system 109 may resemble a traditional performance venue insofar as it may include a stage 201, one or more speakers 209 (e.g., stage monitor 209a, loudspeakers 209b, 209c), and/or lighting 211 comprising one or more lights, thereby allowing the performers 200a, 200b ( . . . 200n) to perform a live show, speech, act, etc., in an environment similar to a traditional live event with an in-person and local audience. In addition, performance system 109 may further include one or more cameras (e.g., videocameras) 203a, 203b, . . . 203n for capturing event video, and/or one or more microphones 205 for capturing event audio. Any number of cameras/mics can be used or embedded throughout performance system 109 to provide multiple points of view based on seat position associated with one or more spectators. Performance system 109 may also include one or more audience displays (e.g., display 207) for providing audience video back to the event performers 200. Audience display 207 may be large in scale as compared to the performers 200. For example, audience display 207 may be 10 feet diagonal or larger, and in some instances may be 50 feet diagonal or larger. In some embodiments performance display 207 may be as large as the "curtain opening" or curtain window of the stage on which the performers are performing, such that when the performers look out from the stage towards where a live audience would be positioned, the display 207 is large enough to visually reproduce an audience of a size and scale similar to that which the performer(s) would see while performing a traditional live show. FIG. 11 illustrates a view 1101 of a performer giving a traditional live performance in front of an audience located within in the same venue. FIG. 12 illustrates a view 1201 of a performer giving a performance using an audience display screen 207 according to one or more illustrative aspects described herein.

Audience display 207 may itself be comprised of multiple smaller displays joined together and displaying a single video feed across all displays, or each display displaying its own video feed which, when viewed together, provide audience information as described herein. Each of the elements of FIG. 2 are shown only by way of example, and may be configured differently and/or in different locations than as shown in FIG. 2. For example, the stage may or may not be raised, and the stage may or may not be a physically separate object from another portion of the venue (for instance, it may be an arbitrary area that is designated as a performance area and thus would be the stage). Also, each of audience display 207, cameras 203, speakers 209, lights 211, and/or a management console 213 may be on stage or off stage.

Figure 4:
FIGS. 4-6 illustrate examples of surrogate displays according to one or more illustrative aspects described herein.
Figure 5:
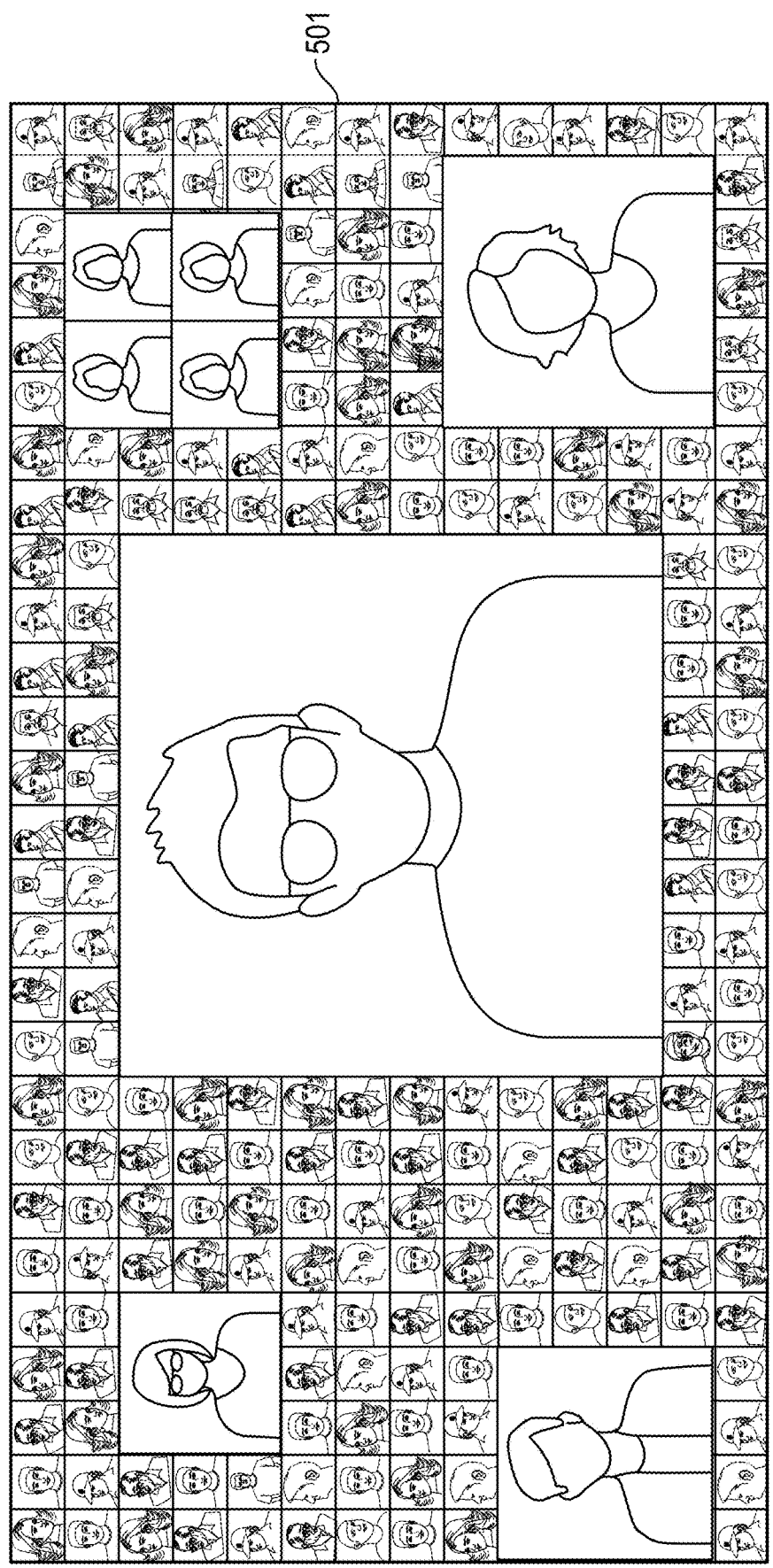
Figure 6:
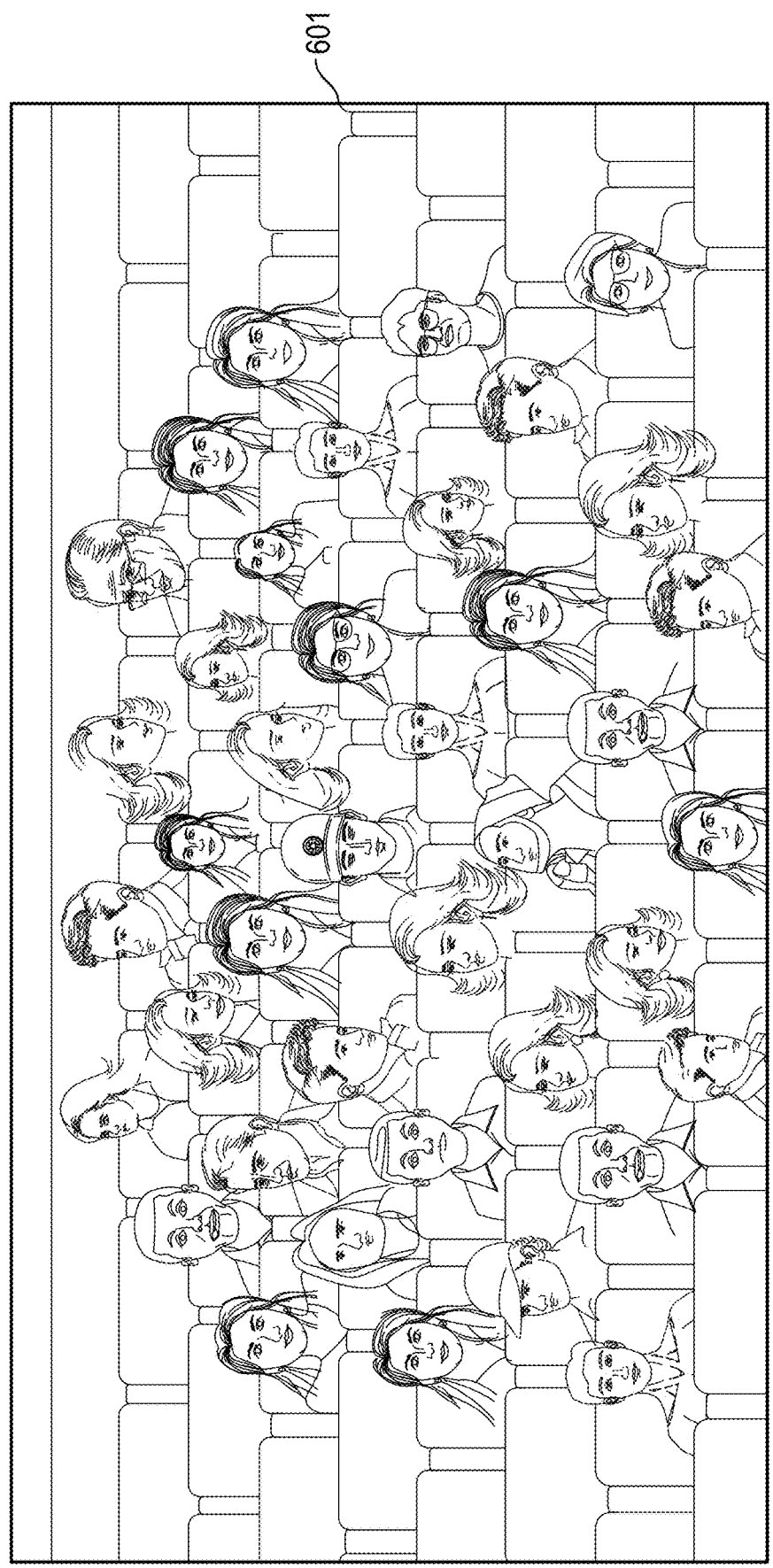

Audience display 207 may present a plurality of the audience members in a variety of ways. For example, audience display 207 may include a grid 401 (FIG. 4) or other arrangement of surrogates of each of a plurality of users (audience members, also referred to as spectators) watching the event. The surrogates may be similarly sized or have different sizes such as depicted on layout 501 (FIG. 5) depending on the benefits associated with each user as further described herein. The surrogates need not be limited to a grid format, and may be combined into a virtual audience layout 601 (FIG. 6) by artificial intelligence (AI) program, computer vision, and/or other graphic generation software. A game engine may be used to render the audience in a simulated venue, where each surrogate may be depicted in a predetermined position within the simulated venue. Audience display 207 may depict a static or dynamic set of surrogates, based on the size of the audience display 207 versus the desired size of each surrogate in view of the number of spectators who purchased tickets to the event. The displayed surrogates may be arranged on the audience display 207 and/or dynamically adjusted in real time during the performance.

Figure 3:
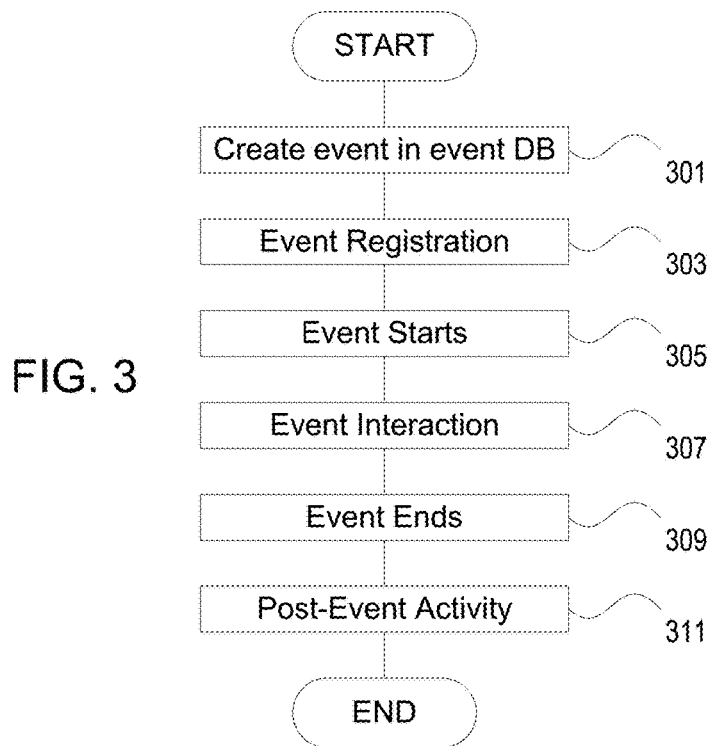
FIG. 3 illustrates a flowchart showing an example method of producing and distributing a remote live event according to one or more illustrative aspects described herein.

With further reference to FIG. 3, methods of operation of the live event production, performance, and distribution network will now be described in more detail. Initially, when an event is scheduled, event information may be added to an event database in step 301, e.g., first database 129. Event information may include information such as performer name(s), date, time, audience size limits (optional maximum and minimum limits for the performance to occur), ticket prices, benefit levels, merchandise information, and/or any other information associated with the event/performance. Event information may further include a date and/or time on which tickets go on sale.

Figure 7:
FIGS. 7-8 illustrate examples of video frames from a video feed according to one or more illustrative aspects described herein.
Figure 8:

Some events might include or be associated with only a single ticket price and single benefit level. Other events might offer tickets of varying prices, each of which may be associated with a different benefit level. A particular benefit level may be indicative of, or otherwise associated with, one or more benefits (e.g., particular experiences or other services provided to the ticket purchaser) available before, during, and/after the event. For example, a first (base level) ticket price might be associated with a first benefit level that, for example, provides to the ticket purchaser a non-interactive video stream 701 (FIG. 7) of the event from a camera 203*a* located at a fixed distance from the performance stage 201. A second (higher level) ticket price might be associated with a second benefit level having one or more benefits not included in the first benefit level, e.g., a video feed 801 (FIG. 8) from a camera 203*b* located closer to stage 201 than camera 203*a* (or alternatively, zoomed in closer than camera 203*a*, or otherwise providing the ticket purchaser a closer up and more intimate experience for the ticket purchaser than that provided in the first benefit level). The video in FIG. 7 or 8, for example, may be presented to the user via the user's device 106, 107, or 108, and may be presented as audio only, video only or video and audio together. There may be any number of desired ticket prices, each associated with its own benefit level(s). Other benefits might include an ability for the ticket purchaser to digitally or optically zoom in on the stage (e.g., up to a fixed amount of zoom associated with that benefit level), or to otherwise control the camera such as by panning or tilting the camera. Each ticket purchaser at a benefit level allowing for camera control may have one or more time windows of opportunity to control the camera, after which time another of the ticket purchasers at that benefit level may have their opportunity to control the camera, and so on for each of those ticket purchasers. For example, each of those ticket purchasers may be provided the opportunity to control the camera for a time window in the range of 10 seconds to 30 seconds, or in the range of 30 seconds to one minute, or longer. Camera control might also rotate among all purchasers having that benefit, etc.

Each benefit level might also include or otherwise be associated with an audience feedback level. For example, a first audience feedback level may be associated with no representation of a spectator on audience display 207. A second audience feedback level may, for example, be associated with displaying the spectator's surrogate on audience screen 207 in some manner that may depend upon the particular audience feedback level. For example, for one particular audience feedback level the spectator may be provided with minimal representation on audience display 207, e.g., by a small surrogate or other image (e.g., an avatar), and for another particular audience feedback level the spectator may be provided with a more prominent representation on audience display 207, such as by representing their surrogate on audience display 207 in one or more larger sizes, where the size may vary depending on the benefit level associated with the spectator depicted by the surrogate.

An audience feedback level may also include some amount of ability to interact directly with the performer(s). For example, when a user has purchased a ticket (or has otherwise been granted access, e.g., as a comp, or as selected by the performer during a performance), depending upon the particular audience feedback level associated with the benefit level of the ticket, the performance system may enlarge the display of the user's surrogate on audience display 207, and/or open an audio channel originating from the user/ spectator's device (e.g., any of elements 106-108) through which the spectator can interact audiovisually with the performer. Such interaction may be limited in duration (e.g., interaction by the spectator limited to being available for a particular time window such as ten seconds or less, or thirty seconds or less, or one minute or less, or a longer window) or continuously available as desired, based on the benefit level. The performance server 103 may temporarily allow a video feed from the user device (e.g., captured by a camera of the user's device 106, 107, or 108 via I/O interface 119 of that user device) to be displayed on the performance screen so the performer can see the actual spectator they are interacting with when, e.g., the surrogate is other than a live video as further described below. The management console 213 might present a preview or otherwise screen the video feed from the spectator before displaying the spectator video feed on audience display screen 207 to ensure it contains appropriate subject matter for that performance/performer and, once approved, cause the video feed from the spectator to be displayed on audience display screen 207.

In some embodiments there might be a limited number of tickets per "seat" in an actual or simulated venue, e.g., 1 ticket or 4 tickets per seat, box, etc. In such an embodiment, there may be an actual or virtual camera associated with each purchasable location, and the user purchasing that ticket would see the actual or virtual camera view of the event as if the user were actually sitting in that location within the venue. Stated differently, each audience members' camera angle or point of view (POV) of the stage might be representative of their "seat" or location purchased. When a user registers for an event in step 303 (discussed further below), the user picks their seat and completes their purchase. If the ticket limit is reached for that location, no further users may be permitted to purchase seats in that location.

After an event has been registered in the database 129 and performance server 103 determines that the tickets are available for sale (e.g., during a predetermined sale time associated with the event), performance server 103 may provide a ticket purchase option for that event to users visiting the performance server and/or system through a network such as the Internet or world wide web. In step 303 one or more users may purchase tickets to the event, each with an associated benefit level. Any online and/or digital ticketing system may be used, now known or later developed. For example, the tickets may be associated with unique 2D bar codes. Such digital ticketing systems are well known in the art, e.g., as used by TicketFly, TicketMaster, EventBrite, and the like.

Before, during or after the ticket purchase process, a user may create an account on the performance network, which may include an indication of one or more user preferences for types of events that the particular user is interested in, creation of one or more surrogates for the user (one of which can be set to be a default surrogate for the user), provision of at least a minimal set of information necessary to complete ticket purchases and account transactions, and/or any other information to be associated with the user, e.g., opt-in/opt-outs for marketing and advertising of future events, etc. Account information may be stored in a database, e.g., database 131.

Figure 9A:
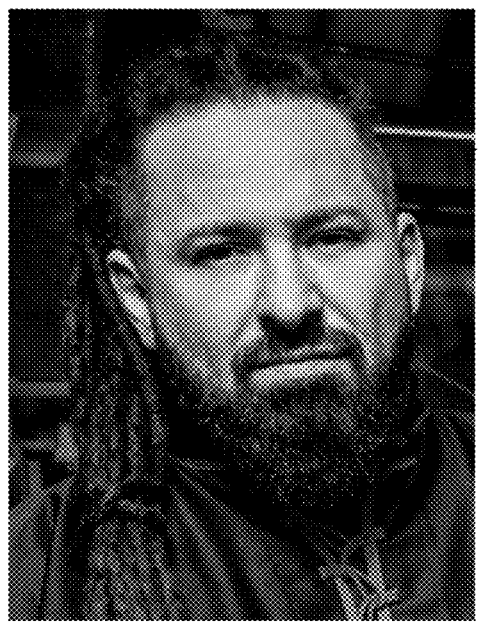
FIG. 9A illustrates an example of an image uploaded for a surrogate according to one or more illustrative aspects described herein.
Figure 9B:
FIG. 9B illustrates an example of a 3D extrapolation of the image from FIG. 9A, which may be for use on a 3D avatar for a surrogate, according to one or more illustrative aspects described herein.

As previously discussed, a surrogate may be used as a representation of a particular user/spectator on the audience screen 207 during a particular event. Each surrogate may be depict or otherwise be representative of a video feed originating at a spectator's client device, and may be displayed back for the performer to see the actual spectator on audience display 107. Additionally or alternatively, the surrogate may be a photo of the user uploaded by the user or taken via a device's integrated or connected camera. In some aspects, the surrogate may be selected from a predetermined set of user-selectable avatars, that is, an image or other content other than an actual depiction of the user but which is representative of that particular user (e.g., an alligator-headed monster, a flower, a cartoon character, a musical instrument, etc.). In some embodiments, users may upload an image to use as a surrogate and/or avatar, e.g., a photo of themselves or any other image The surrogate may be animated, e.g., using a small video or animation file, animated GIF, or when integrated with a device capable of mimicking a user's face, e.g., such as by using animoji on a capable APPLE iOS device, when logged in through a mobile app associated with the performance network. A user may upload a picture of their own face 901 (FIG. 9A), which the system may wrap and place on a 3D model to create a 3D surrogate 903 (FIG. 9B) depicting a model of the user's actual face. The performance network may use 3D face reconstruction such as is described (and source code provided) by Aaron S. Jackson, Adrian Bulat, Vasileios Argyriou and Georgios Tzimiropoulos of the Computer Vision Laboratory, The University of Nottingham, at https:// cvl-demos.cs.nott.ac.uk/vrn/.

Figure 10:
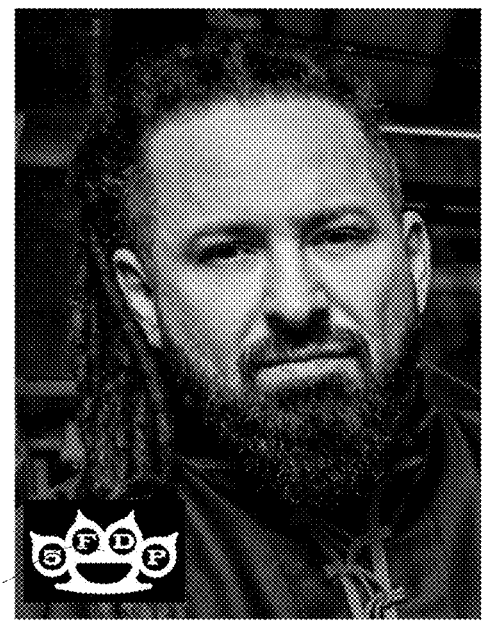
FIG. 10 illustrates an example of a surrogate badge according to one or more illustrative aspects described herein.

Once registration is complete, each spectator may then wait for the event to start, or may log back in at such time that the event starts in step 305. During the event, each spectator may interact with the event in step 307 to the extent that their benefit level allows them to, and the performers may interact with the audience as further described herein. Spectators in the audience may view the event through any of the video feeds to which their ticket benefit level provides access. Users can also pick or change their surrogate for the event (e.g., use a different surrogate/ avatar for each event), and might receive a special badge or logo 1001 to display in coordination with their surrogate for the duration of the event and/or a predefined amount of time thereafter, e.g., a representative example of which is shown in FIG. 10. A user might also be able to dress their surrogate using virtual clothes or other items, and the user might dress their surrogate for the event, or pick an overlay akin to a Snapchat Filter or Lens, or Instagram Sticker.

Users may be able to purchase band merchandise through the performance network 100, e.g., t-shirts, hats, paraphernalia, etc, using an online store feature of the performance network. One or more items of merchandise may itself be associated with one or more benefits before, during, and/or after the event concludes. For example, a t-shirt might be associated with the ability of the user to dress their surrogate in a graphical depiction of that t-shirt to depict that user's purchase. Purchase of a Zippo® lighter or phone case with the performer's logo on it might be associated with the ability of the surrogate to temporarily increase in brightness on audience display 207, or otherwise display a representation of a candle or light adjacent to or overlapping the spectator's avatar.

For some events, a ticket might be associated with a "seat" or location on audience display 207. For other events, each spectator's location on the surrogate grid might be random or determined based on benefit level. For example, one benefit level may be associated with one subset of possible locations on audience display 207 (e.g., locations near the edge of the display and thus in a less prominent location), and another benefit level may be associated with a different subset of possible locations on audience display 207 (e.g., more centralized and thus more prominent locations). In addition, for some events a ticket's benefit level might be associated with a particular video stream of the event, e.g., a nearer or farther camera view based on which benefit level is associated with the ticket. For some events, a ticket might be associated with a particular seat or view of the stage in an actual venue, and any user who purchases that ticket would receive a video stream of the event associated with that location. In some embodiments tickets might be limited per camera, while in others tickets might be unlimited per camera. Any number of different camera angles may be provided.

For some events, a benefit level might not be associated with a particular camera or view in advance. In such instances, when the event opens up for users to log in to view the event, the performance network may use a game engine or similar graphical rendering system to graphically depict a virtual venue through which the user causes their surrogate (e.g., using a game controller, mouse, keyboard, etc.) to move (e.g., walk, run, fly etc.) to a designated area in the virtual venue before others do. Any users within a preselected number that reach the area first might be presented with a closer up view of the event than users who did not reach the area as fast. In this manner the performance network can provide a virtual mosh pit that users run to when the virtual venue gates open up prior to the event.

According to yet further aspects, the game engine may be adapted to provide interactive game play features before, during, or after the event. In one embodiment, users may interact with other avatars as player characters within the virtual venue. For example, a user may attempt to impede another user's attempts to reach the virtual mosh pit, e.g., by initiating an action against the other avatar (trip, throw an object, fight, etc.). Those users who are more adept (or lucky) reach the designated mosh pit area first, which has limited space, and thereby receive access to a better video stream of the event than users who did not reach the virtual mosh pit. Audience members may or may not be able to see and interact with other audience members depending upon the benefit level and/or event. In some embodiments audience member interaction might be limited to interaction with others who have purchased "seats" near each other. For example, audience members might only be permitted to interact with a surrogate that they are next to on audience display 207. As another example, audience members might be limited to interacting with audience members who purchased a nearby or similar seat (e.g., within 1, 3, or 10 seats of each other, or any other predetermined number) or who purchased a same camera angle view of the event.

According to another aspect, audience interaction might be dynamic based on a user moving backward or leaving the show. For example, performance server 103 might allow users to change seats during a performance when predefined conditions are met. In some embodiments a user might be able to move "backward" at any time, but a user might only be able to move forward if another user vacated their seat/location (e.g., by themselves moving backward or logging off). In other embodiments a user might select an option presented via a user interface to freeze their surrogate and/or turn off dynamic audience interaction so that no other audience members can talk or interact with them. According to various aspects, different capabilities may be associated with smaller versus larger screens, as well as whether an event is being viewed in a full screen mode versus windowed view.

According to another aspect, interaction might be limited to "friends" or other authorized other users/surrogates. Friends might be determined from any source, e.g., an address book, Facebook, Snapchat, etc. The performance server may allow a user to selectively determine which other users can see and/or interact with them. For example, a user might select an option to permit friends to see their surrogate (e.g., actual photo/live video stream), whereas other users (non-friends) might instead see an avatar or other non-literal representation of the user. In another example, a user might allow friends to contact them "at the concert" but to ignore contact requests from non-friends. Furthermore, a user can select a mode where the user names of other users on their friends list might be displayed above their surrogates/avatar in the simulated venue. In this manner, when the user scans the crowd, the user might actually see his or her friends who are also watching the show at the same time. The user might even go to them in virtual space and interact, e.g., by standing next to their surrogates, and discussing the show. When two surrogates are within a predetermined distance of each other in the simulated venue, or when other criteria are met, text channel, audio and/or video chat may be provided between the two.

At some point during the event, a performer might call out a particular spectator even when that particular spectator did not pay for a particular benefit, just as a performer can reach out to an audience member during a traditional live performance ("hey you, in the red shirt with the green hair . . . "). In such an instance, an operator using management console 213 can select the surrogate associated with the called out spectator, causing the performance system to take some special action with respect to that surrogate and/or the user associated with the surrogate. In some cases the performance network may enlarge the surrogate while the performer is interacting with that spectator. In some cases the performance network may permit and open a live video channel from the spectator's associated device and replace the surrogate with the live video feed from the spectator (when the surrogate is not already a live video feed), thereby allowing the performer to interact audiovisually with the spectator. In some cases the performance network might only open an audio channel (where sound is received via the microphone of the spectator's client device) and may visually alter the selected surrogate to indicate that the user is speaking back to the performer, e.g., by creating a visual glow, throb, articulation, or vibration visual effect around that surrogate.

When the event ends in step 309, the performance network may be configured to provide post event services and follow up in step 311. For example, users might be contacted for post-event opportunities related to the event, such as regarding merchandise discounts offered only to event attendees, or discounts on future performances by the same or different performers. The system may also offer benefits or offers to users who purchased tickets of predetermined level. In one example all purchasers of a selected level of benefits may be entered in a random drawing for one on one video interaction with the performer, akin to going "back stage" after a concert is over. Another post-even option might include a selected set of one or more audience members joining a smaller group interaction with the performer at some time after the general event ends. Any number or combination these or alternative post-event options may be provided.

Using the performance network described herein, entertainers can perform, produce and distribute live events to remote audiences. In addition, spectators can watch live performances and performers can see the audience on the audience display 207 presented in front of the performers. Performers don't necessarily need to wear any special equipment, yet may still be able to interact with audiences in a manner similar to how they interact with audiences in a traditional in-person live performance, because the performance system 109 may project and/or simulate at least some of what the performer would see and hear from the audience during a live in-person performance. For example, the sound from all audience members' associated devices might be turned on, combined, and played through speakers 209 for the performer to hear, and the band can get energy from the audience as if the audience were physically present. The performance network thus may provide both the performers and the audience a real live performance experience, but without the need for the audience to be physically present at the location of the live event.

Figure 13:
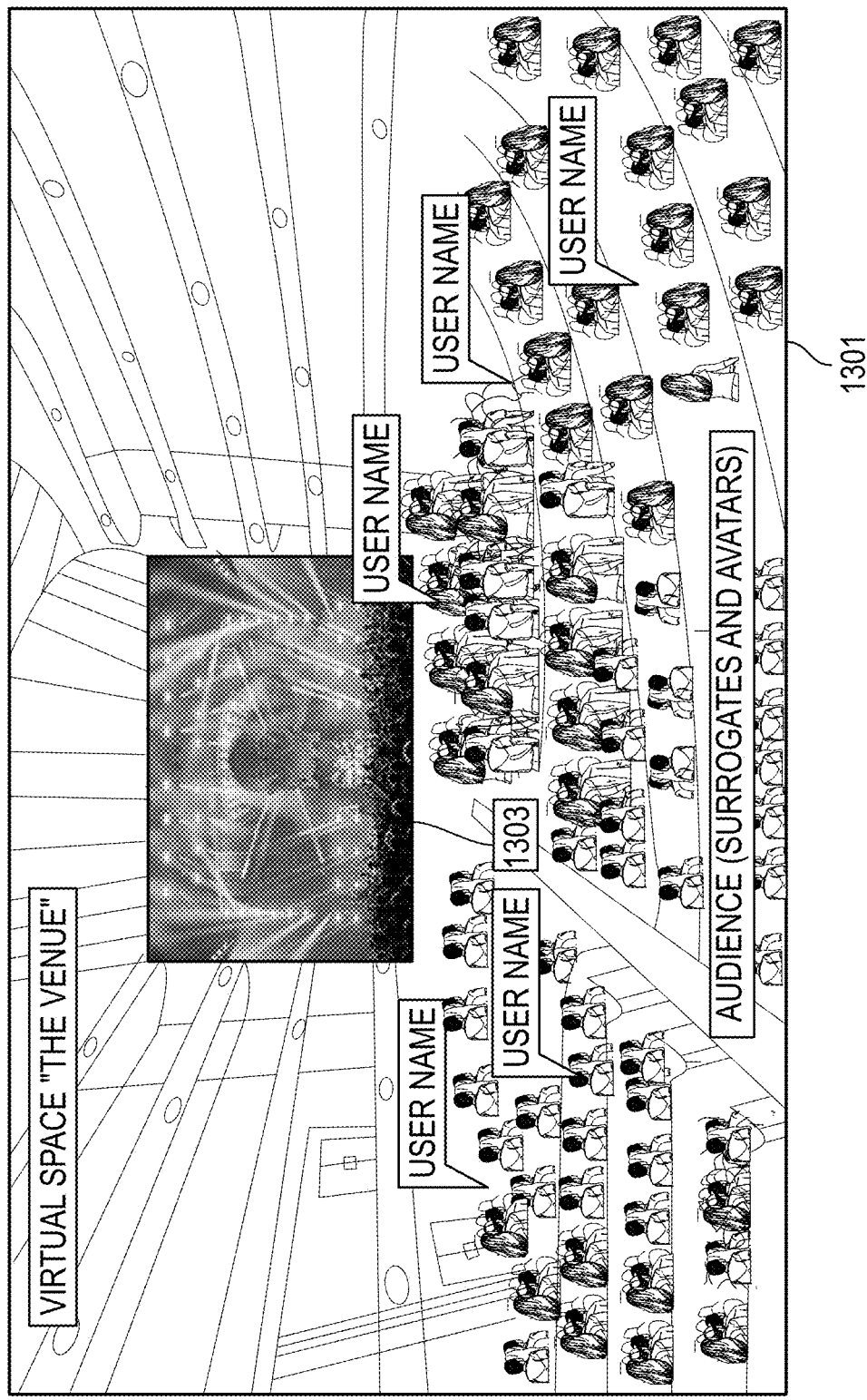
FIG. 13 illustrates a virtual venue with an audience view of the performance of FIG. 7 according to one or more illustrative aspects described herein.

Optionally, the virtual space in which attendees are inserted may be rendered to depict any desired venue (e.g., an amphitheater, arena, thunder-dome on the moon, the Acropolis, etc.) whereas the stage may include an actual depiction of the actual real life stage and performance as captured by system 109, and then be inserted into the virtual space, thereby creating a hybrid of virtual and real space. FIG. 13 illustrates an example of a virtual venue 1301 in which surrogates and avatars purchase seats, each with an associated perspective view of performance 1303 (e.g., view 701, FIG. 7). That is, the surrogates may see the stage and performer from their POV (or optionally can select full screen or other angles as permitted) from the virtual space. Movement of users/surrogates from one "seat" to another might be permitted or limited as further described herein.

Figure 14:
FIG. 14 illustrates a performer view of the system depicting a virtual venue according to one or more illustrative aspects described herein.

FIG. 14 similarly illustrates a performer's 200 view of audience display 207 from stage 201. The real life performer from a real stage can see the audience (surrogates or avatars) residing in virtual space on the audience feedback screen 207. The event production system may thereby create a scenario like a movie reversed, where the audience is in the virtual space and the performer is real, yet they can still interact with one another—the performer and audience may be able to see and hear each other to visual and audibly interact. Like a comedian can be actually heckled, the crowd may be permitted to scream at a speaker, boo a politician, or cheer for a band, while the performer can point at and speak to a remote viewer's representation (surrogate, avatar, etc.).

While performers do not need to wear any special equipment, performers may optionally be equipped with special equipment such as augmented reality headwear. The augmented reality headwear may be used instead of or in addition to using a larger performance screen such as audience display 207, thereby potentially reducing some cost that might otherwise be associated with the system. By using augmented reality, e.g., Microsoft HoloLens or nReal Light, a performer can still see to play their instrument(s), yet still receive information from performance system 109 in a peripheral manner. AR control software (e.g., software 125, 127) may be configured to only provide audience information when a performer looks up and out at where a traditional audience would be located, and to prevent information display when the performer is looking elsewhere so that the performer can see his or her instrument, notes, or other on-stage props. The AR control software may be configured to provide different information based on where the performer is looking using head tracking, 1D/2D/3D bar codes, or object recognition based on what the camera(s) within the AR glasses capture. Thus, when the performer looks at the location where an audience would otherwise be, the AR glasses may display a virtual audience display similar to that on audience display 207 or a subset thereof as the performer looks around. When the performer looks off stage the AR control software may display management options for controlling sound, spectator selection, camera options, isolating microphones or incoming spectator audio/video, or other administrative features, and when the performer looks down by more than a specified angle, e.g., 5, 10, 15, or 25 degrees below horizon as nonlimiting examples, all display may be omitted or turned off so the performer can play an instrument or use other on-stage props. In some aspects, when a performer looks at a particular region of the virtual audience display for a predetermined amount of time, e.g., 1-5 seconds, the AR glasses may zoom in on that region of the virtual audience display and provide enhanced interaction features for one or more surrogates displayed in that region of the virtual audience display.

Using aspects described herein, performers can perform, produce, and distribute live events for and to remote users while still benefiting from audience emotional response, engagement and feedback similar to that experienced during a traditional live performance. Similarly, attendees of events experience a more realistic and authentic performance.

Although the subject matter has been described in language specific to structural features and/or methodological acts, it is to be understood that the subject matter defined in the appended claims is not necessarily limited to the specific features or acts described above. Rather, the specific features and acts described above are disclosed as illustrative forms of implementing the claims.

What is claimed is:

1. An event production system, comprising:
a performance server in data communication with one or more video cameras configured to capture video of a performance on a stage, one or more microphones configured to capture audio of the performance on the stage, one or more speakers configured to provide audio to the stage, and an audience display screen displaying content visible from the stage, and comprising a processor and memory storing computer readable instructions that, when executed by the processor, configure the event production system to perform:
registering a plurality of users for a first event, wherein each registration is associated with a benefit level selected from a plurality of benefit levels, and wherein each benefit level within the plurality of benefit levels is associated with a different set of benefits;
at an event start time, initiating an event audiovisual stream from the one or more video cameras and one or more microphones for playback to, for each registered user, a device associated with that user;
displaying on the audience display screen a surrogate associated with each of the plurality of users during the event, wherein a first benefit level is associated with a first surrogate size for each user registered at the first benefit level, and wherein a second benefit level is associated with a second surrogate size for each user registered at the second benefit level, and wherein the system is configured to present each surrogate on the audience display screen at a size defined by each user's corresponding benefit level; and
providing an interactive feature through which one or more registered users dynamically interact with a performer providing the performance during the event.

2. The system of claim 1, wherein a first benefit level is associated with a first audiovisual stream of the performance, and wherein a second benefit level is associated with a second audiovisual stream of the performance.

3. The system of claim 1, wherein one or more surrogates comprise a video feed originating from the user device associated with that surrogate.

4. The system of claim 1, wherein the performance server is further configured to perform:
generating an audience feedback audio signal; and
transmitting the audience feedback audio signal for output through one or more speakers located within earshot of the live event.

5. The system of claim 4, wherein generating the audience feedback audio signal comprises, responsive to selection of a particular surrogate on the audience display screen by an authorized user, activating an audio feed originating from a client device associated with the selected surrogate.

6. The system of claim 4, wherein generating the audience feedback audio signal comprises, responsive to user input by an authorized user, combining audio associated with substantially all client devices associated with any surrogate.

7. A performance server comprising:
one or more interfaces establishing data communications between the performance server and one or more video cameras configured to capture video of a performance on a stage, one or more microphones configured to capture audio of the performance on the stage, one or more speakers configured to provide audio to the stage, and an audience display screen displaying content visible from the stage;
a processor; and
memory storing computer readable instructions that, when executed by the processor, configure the performance server to perform:
registering a plurality of users for a first event, wherein each registration is associated with a benefit level selected from a plurality of benefit levels, and wherein each benefit level within the plurality of benefit levels is associated with a different set of benefits;
at an event start time, initiating an event audiovisual stream from the one or more video cameras and one or more microphones for playback to, for each registered user, a device associated with that user;
displaying on the audience display screen a surrogate associated with each of the plurality of users during the event;
providing an interactive feature through which one or more registered users dynamically interact with a performer providing the performance during the event;
presenting an online shop through which any registered user can purchase one or more items of merchandise associated with the event;
when a user purchases a first item, unlocking a first surrogate modification selectable by the purchasing user; and
when a user purchases a second item, unlocking a second surrogate modification selectable by the purchasing user, different from the first surrogate modification.

8. The performance server of claim 7, wherein a first benefit level is associated with a first audiovisual stream of the performance, and wherein a second benefit level is associated with a second audiovisual stream of the performance.

9. The performance server of claim 7, wherein one or more surrogates comprise a video feed originating from the user device associated with that surrogate.

10. The performance server of claim 7, wherein the performance server is further configured to perform:
generating an audience feedback audio signal; and
transmitting the audience feedback audio signal for output through one or more speakers located within earshot of the live event.

11. The performance server of claim 10, wherein generating the audience feedback audio signal comprises, responsive to selection of a particular surrogate on the audience display screen by an authorized user, activating an audio feed originating from a client device associated with the selected surrogate.

12. The performance server of claim 10, wherein generating the audience feedback audio signal comprises, responsive to user input by an authorized user, combining audio associated with substantially all client devices associated with any surrogate.

13. A method comprising:
registering a plurality of users for a first event, wherein each registration is associated with a benefit level selected from a plurality of benefit levels, and wherein each benefit level within the plurality of benefit levels is associated with a different set of benefits;
at an event start time, initiating an event audiovisual stream originating from a one or more video cameras configured to capture video of a performance on a stage and from one or more microphones integrated into and/or separate from said video cameras and configured to capture audio of the performance on the stage, for playback to, for each registered user, a device associated with that user;
displaying on an audience display screen visible from the stage, a surrogate associated with each of the plurality of users during the event;
providing an interactive feature through which one or more registered users dynamically interact with a performer providing the performance during the event;
presenting an online shop through which any registered user can purchase one or more items of merchandise associated with the event;
when a user purchases a first item, unlocking a first surrogate modification selectable by the purchasing user; and
when a user purchases a second item, unlocking a second surrogate modification selectable by the purchasing user, different from the first surrogate modification.

14. The method of claim 13, wherein a first benefit level is associated with a first audiovisual stream of the performance, and wherein a second benefit level is associated with a second audiovisual stream of the performance.

15. The method of claim 13, wherein one or more surrogates comprise a video feed originating from the user device associated with that surrogate.

16. The method of claim 13, further comprising:
generating an audience feedback audio signal; and
transmitting the audience feedback audio signal for output through one or more speakers located within earshot of the live event.

17. The method of claim 16, wherein generating the audience feedback audio signal comprises, responsive to selection of a particular surrogate on the audience display screen by an authorized user, activating an audio feed originating from a client device associated with the selected surrogate.

18. The method of claim 16, wherein generating the audience feedback audio signal comprises, responsive to user input by an authorized user, combining audio associated with substantially all client devices associated with any surrogate.

19. A method comprising:
registering a plurality of users for a first event, wherein each registration is associated with a benefit level selected from a plurality of benefit levels, and wherein each benefit level within the plurality of benefit levels is associated with a different set of benefits;
at an event start time, initiating an event audiovisual stream originating from a one or more video cameras configured to capture video of a performance on a stage and from one or more microphones integrated into and/or separate from said video cameras and configured to capture audio of the performance on the stage, for playback to, for each registered user, a device associated with that user;
displaying on an audience display screen visible from the stage, a surrogate associated with each of the plurality of users during the event, wherein a first benefit level is associated with a first surrogate size for each user registered at the first benefit level, and wherein a second benefit level is associated with a second surrogate size for each user registered at the second benefit level, and wherein the system is configured to present each surrogate on the audience display screen at a size defined by each user's corresponding benefit level; and
providing an interactive feature through which one or more registered users dynamically interact with a performer providing the performance during the event.

20. The method of claim 19, wherein a first benefit level is associated with a first audiovisual stream of the performance, and wherein a second benefit level is associated with a second audiovisual stream of the performance.

21. The method of claim 19, wherein one or more surrogates comprise a video feed originating from the user device associated with that surrogate.

22. The method of claim 19, further comprising:
generating an audience feedback audio signal; and
transmitting the audience feedback audio signal for output through one or more speakers located within earshot of the live event.

23. The method of claim 22, wherein generating the audience feedback audio signal comprises, responsive to selection of a particular surrogate on the audience display screen by an authorized user, activating an audio feed originating from a client device associated with the selected surrogate.

24. The method of claim 22, wherein generating the audience feedback audio signal comprises, responsive to user input by an authorized user, combining audio associated with substantially all client devices associated with any surrogate.

* * * * *